R. M., W. J. & J. GREUTMANN.
COMBINATION WIRE STRETCHER AND WAGON JACK.
APPLICATION FILED AUG. 25, 1917.
1,257,216. Patented Feb. 19, 1918.
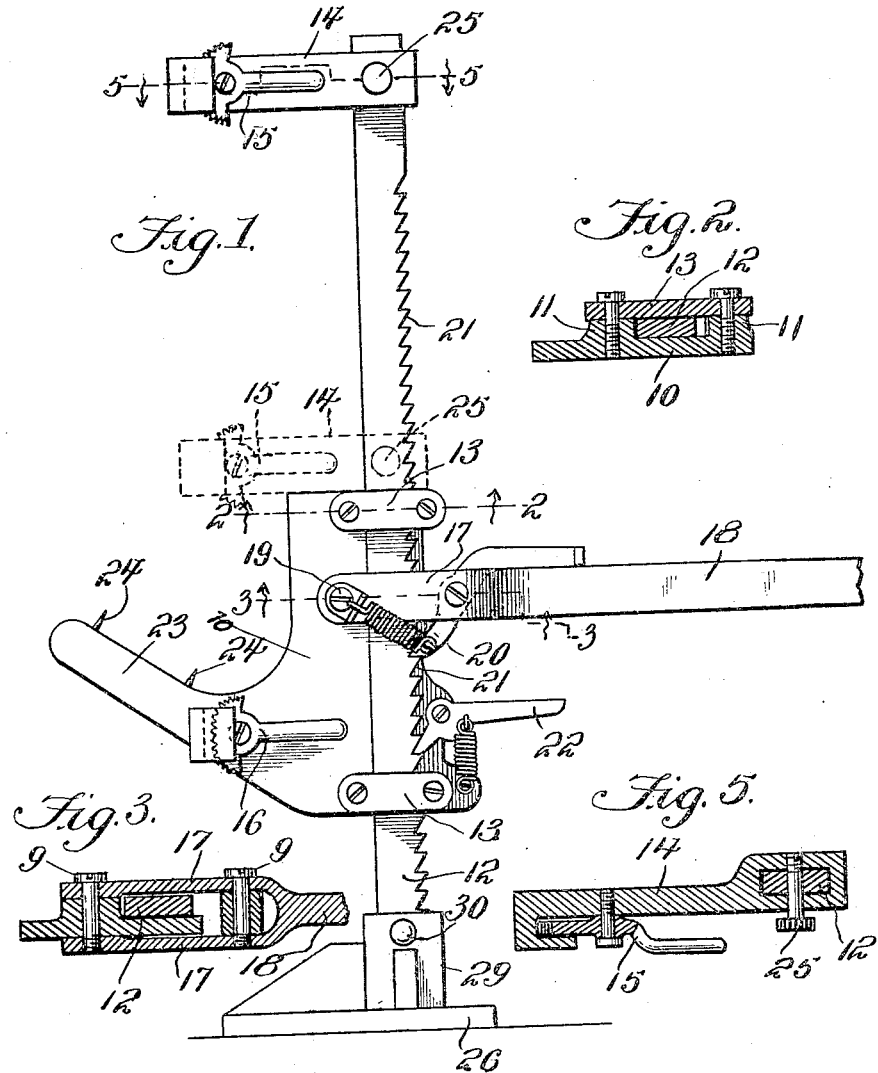
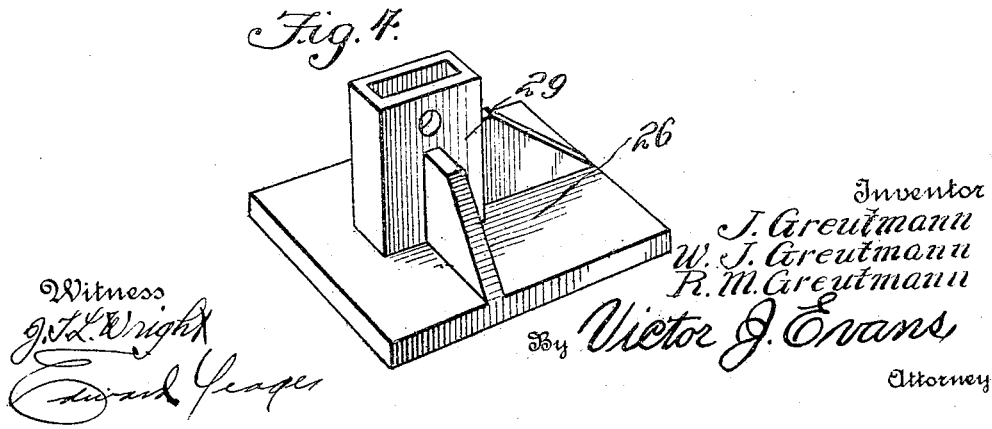

UNITED STATES PATENT OFFICE.

ROMA M. GREUTMANN, WILLIAM J. GREUTMANN, AND JOHN GREUTMANN, OF MILLER, NEBRASKA.

COMBINATION WIRE-STRETCHER AND WAGON-JACK.

1,257,216.  Specification of Letters Patent.  Patented Feb. 19, 1918.

Application filed August 25, 1917. Serial No. 188,211.

*To all whom it may concern:*

Be it known that we, ROMA M. GREUTMANN, WILLIAM J. GREUTMANN, and JOHN GREUTMANN, citizens of the United States, residing at Miller, in the county of Buffalo and State of Nebraska, have invented new and useful Improvements in Combination Wire-Stretchers and Wagon-Jacks, of which the following is a specification.

This invention relates to a combination wire stretcher and wagon jack, and comprehends certain improvements in a similar device for which Letters Patent 1,179,825 were granted to us April 18, 1916.

The present invention aims to eliminate the jack frame employed in the above mentioned patented structure, and utilizing a part of the wire stretcher to perform the functions of the jack frame, thus simplifying the construction, and at the same time maintaining the component parts of the structure at all times associated, thus obviating the possibility of misplacement of the jack frame which in the patented structure is only associated with the device when its use is desired.

The nature and advantages of the invention will be better understood when the following detail description is read in connection with the accompanying drawing, the invention residing in the construction, combination and arrangement of parts as claimed.

In the drawing forming part of this specification like numerals of reference indicate similar parts in the several views and where in:—

Figure 1 is an elevation of the device showing in full lines the normal position of parts for use as a wire stretcher, with one element thereof shown by dotted lines in a position to permit of the use of the device in the capacity of a wagon jack.

Fig. 2 is a sectional view taken on line 2—2 of Fig. 1.

Fig. 3 is a similar view taken on line 3—3 of Fig. 1.

Fig. 4 is a view of the foot or base of the device.

Fig. 5 is a view taken on line 5—5 of Fig. 1.

In the drawing 10 indicates a base plate which may be constructed from any suitable material and of the desired dimensions, while projecting from one side of the plate is a pair of closely associated lugs 11. Slidably mounted upon the plate 10 and between the lugs 11 is a rack bar 12, the latter being held associated with the base by means of a cross strip 13 bridging the bar 12 and terminally secured to the lug 11 in any suitable manner. Projecting at right angles from the bar 12 is an arm 14, which carries a wire grip 15 of any suitable construction, the latter being disposed in substantially the same plane with the wire grip 16 mounted upon the plate 10.

Straddling the rack bar 12 and the adjacent edge of the plate 10 are the parallel portions 17 of an operating lever 18. The parallel portions are preferably provided by bifurcating one extremity of the lever, and said portions are pivoted as at 19 upon the plate 10. Interposed between said parallel portions and pivotally associated therewith is a spring pressed pawl 20 normally engaging the teeth 21 of the rack bar for moving the latter upon the plate 10 when the lever is moved in one direction. Arranged beneath the lever and pivotally mounted upon the plate 10 is a second spring pressed pawl 22 coöperating with the teeth of the rack bar to prevent slipping or movement of said bar in a direction opposite the direction in which the bar is moved through the instrumentality of the lever, when the pawl 20 is disengaged from the teeth during the movement of the lever in a proper direction to obtain a new grip upon the bar.

In practice, when the device is used in the capacity of a wire stretcher, the horn 23 forming an integral part of the plate 10 is arranged about the fence post (not shown), the prongs 24 projecting from said horn being adapted to bite into the post to hold the device fixed relatively thereto. The strand of wire is then clamped within the wire grip 15 carried by the arm 14, and the lever subsequently operated to move the rack bar in a direction to effect stretching of the wire, but when it is desired to splice the adjacent ends of a broken wire one of the ends of the strand is clamped within the wire grip 16, and the opposite end within the grip 15. The lever is then operated to move the rack bar in a direction to draw the ends of the wire toward each other to be connected.

In accordance with the present invention, the arm 14 is provided with an opening at one end for the reception of the rack bar 12, and this permits the arm a sliding adjustment upon the bar for the purpose to be presently described. The arm preferably carries a threaded element 25 for engagement with the rack bar 12 whereby the arm may be maintained in a fixed position upon the bar, although any other suitable fastening means for this purpose may be utilized. The normal position of the arm 14 is adjacent the extremity of the rack bar 12, as clearly shown in Fig. 1, and in this position the arm 14 is held fixed relatively to the bar. When in this position the device is susceptible for use in the capacity of a wire stretcher, but when it is desired to convert the device into a wagon jack, the fastening means for the arm 14 is loosened, and the arm subsequently lowered upon the bar 12 to the position indicated by dotted lines in Fig. 1. The base plate 10 is of sufficient width, and provided with a straight upper edge, to afford a substantial foundation for the arm 14, the upper edge of the base plate 10 lying substantially flush with the corresponding edges of the cross strips 13 for this purpose. When occupying the position shown by dotted lines in Fig. 1, the arm 14 serves in the capacity of a jack frame, and the device in its entirety can be conveniently used as a wagon jack. When used in this capacity the lever 18 is operated in the same manner as hereinabove described in connection with the wire stretcher, but instead of the rack bar moving upon the base plate 10, the movement of these parts is reversed, that is to say that the plate 10 together with the bar 14 is moved upwardly upon the rack bar 12 as will be readily understood. In this instance the pawl 22 serves to prevent retrograde movement of the plate 10 and bar 14.

With a view of providing a broad bearing surface for the jack, we make use of a foot therefor comprising a relatively broad plate 26 upon which rests the lower end of the rack bar 12, the latter being received from the channel shaped standard 29 rising from the plate and associated therewith in any suitable manner, such as for instance by means of the fastening element 30. It is apparent that we have devised a device of the class in question which is not only simple in construction, but which can be conveniently handled and manipulated for the various purposes intended.

While it is believed that from the foregoing description the nature and advantages of the invention will be readily understood, we desire to have it understood that what is herein shown and described is illustrative of the preferred embodiment, and that such changes in the construction and arrangement of parts may be resorted to when desired as fall within the scope of what is claimed.

What is claimed is:—

1. A device of the class described comprising a pair of relatively movable members, means for effecting an adjustment between said members, means for holding said members in adjusted position, an arm projecting at right angles from one of said members and slidably mounted thereon, means for holding said arm fixed relatively to said member adjacent its upper end in one of its active positions, and said arm being adapted to rest upon the other of said members for movement therewith whereby said device is converted into a lifting jack.

2. A device of the class described comprising a pair of relatively movable members, a lever pivoted on one of said members and operating upon the other member to effect an adjustment between said parts, means for holding said member in adjusted position, an arm slidably associated with one of said members and normally projecting at a right angle therefrom, means for holding said arm fixed relatively to said member adjacent the upper end of the latter, and said arm being adapted to rest upon the said other member for movement therewith with respect to the first mentioned member whereby said device is converted into a lifting jack.

3. A combined wire stretcher and lifting jack comprising a pair of relatively movable members, means for effecting an adjustment between said members, an arm projecting at a right angle from one of said members and slidably associated therewith, a wire grip carried by each of said members and disposed substantially in the same plane, means for holding said arm fixed relatively to said member adjacent the upper end of the latter, and said arm being adapted to rest upon the other of said members for movement therewith longitudinally of the first mentioned member, whereby said device is converted into a jack.

In testimony whereof we affix our signatures.

ROMA M. GREUTMANN.
WILLIAM J. GREUTMANN.
JOHN GREUTMANN.

Copies of this patent may be obtained for five cents each, by addressing the "Commissioner of Patents, Washington, D. C."